(12) United States Patent
Lord

(10) Patent No.: US 7,578,398 B2
(45) Date of Patent: Aug. 25, 2009

(54) BACTERIA GROWTH DEVICE, ASSEMBLY INCLUDING THE SAME AND METHOD ASSOCIATED THERETO

(75) Inventor: Garfield R. Lord, Saint-Lazare (CA)

(73) Assignee: Bionest Technologies, Inc., Grand-Mere, Quebec (CA)

( * ) Notice: Subject to any disclaimer, the term of this patent is extended or adjusted under 35 U.S.C. 154(b) by 297 days.

(21) Appl. No.: 11/683,224

(22) Filed: Mar. 7, 2007

(65) Prior Publication Data
US 2007/0144962 A1 Jun. 28, 2007

Related U.S. Application Data

(62) Division of application No. 10/486,420, filed as application No. PCT/CA02/01462 on Sep. 26, 2002.

(30) Foreign Application Priority Data
Sep. 26, 2001 (CA) .................................. 2357907

(51) Int. Cl.
B01D 29/03 (2006.01)
C02F 3/00 (2006.01)
(52) U.S. Cl. ........................ 210/503; 210/615; 210/616; 210/505; 210/291; 210/290; 210/508
(58) Field of Classification Search ........................ None
See application file for complete search history.

(56) References Cited

U.S. PATENT DOCUMENTS 3,345,668 A 10/1967 Forrest
4,451,362 A 5/1984 Spelsberg
5,580,770 A 12/1996 DeFilippi
5,618,430 A 4/1997 Fuchs

FOREIGN PATENT DOCUMENTS

EP 0 165 862 A1 12/1985
FR 2 639 342 5/1990

OTHER PUBLICATIONS

English Translation of FR 2 629 342.

*Primary Examiner*—Krishnan S Menon
(74) *Attorney, Agent, or Firm*—Darby & Darby, P.C.

(57) ABSTRACT

A bacteria growth device (1) for use with bacteria in a substantially liquid medium, the device (1) comprising at least one strip (5) having a surface area shaped and sized for receiving bacteria present in the substantially liquid medium and for allowing attachment of said bacteria onto the surface area of the at least one strip (5) so as to promote growth of the attached bacteria. The substantially liquid medium may be enclosed in a n aerobic environment, in which case the device (1) is used to promote the growth of aerobic bacteria. Alternatively, the substantially liquid medium may be enclosed in an anaerobic and/or anoxic environment, in which case the device (1) is used to promote the growth of corresponding anaerobic and/or anoxic bacteria. Also, described are an assembly including the above-mentioned device and the method associated thereto. Typically, these are used for promoting growth of bacteria destined for treating and purifying wastewater effluents which are high in biochemical demand, such as the wastewater discharges of residential and/or industrial septic/wastewater tanks for example.

7 Claims, 9 Drawing Sheets

Bio Nest

Bio Nest

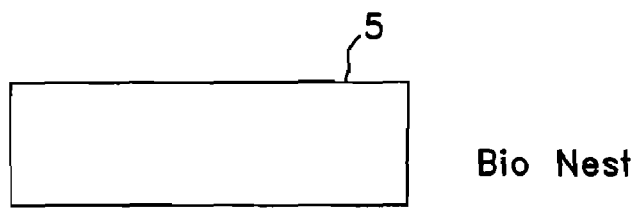
Bio Nest
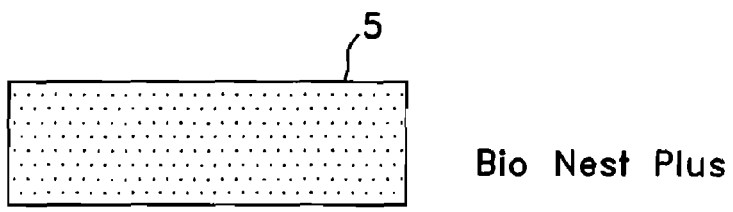
Bio Nest Plus
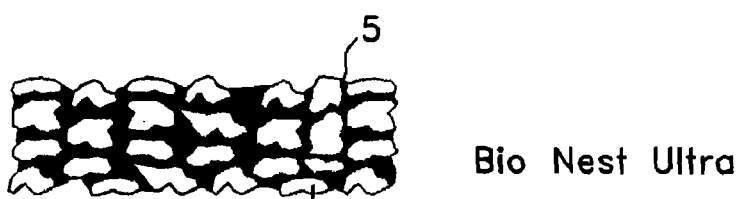
Bio Nest Ultra
Zeolyte
Bio Nest Ultra Pre-Etched or Pre-Machined Figure 8: Diagram illustrating the apparent color of the water
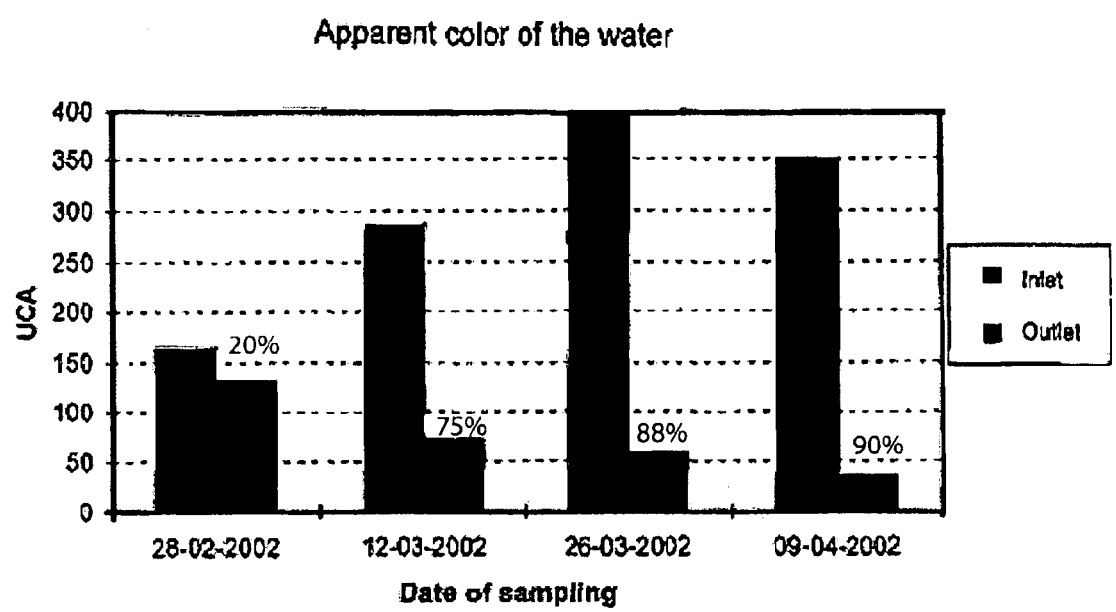

Figure 9: Diagram illustrating the suspended matter
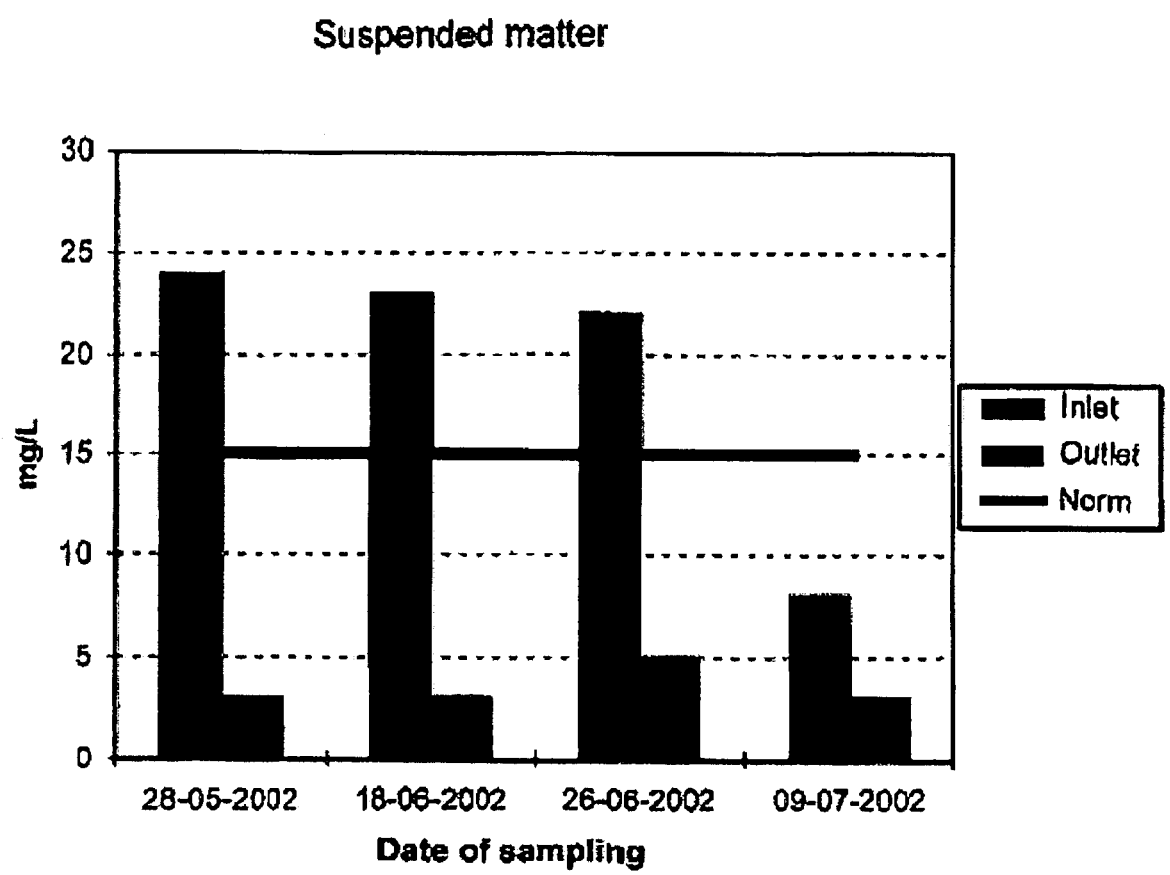

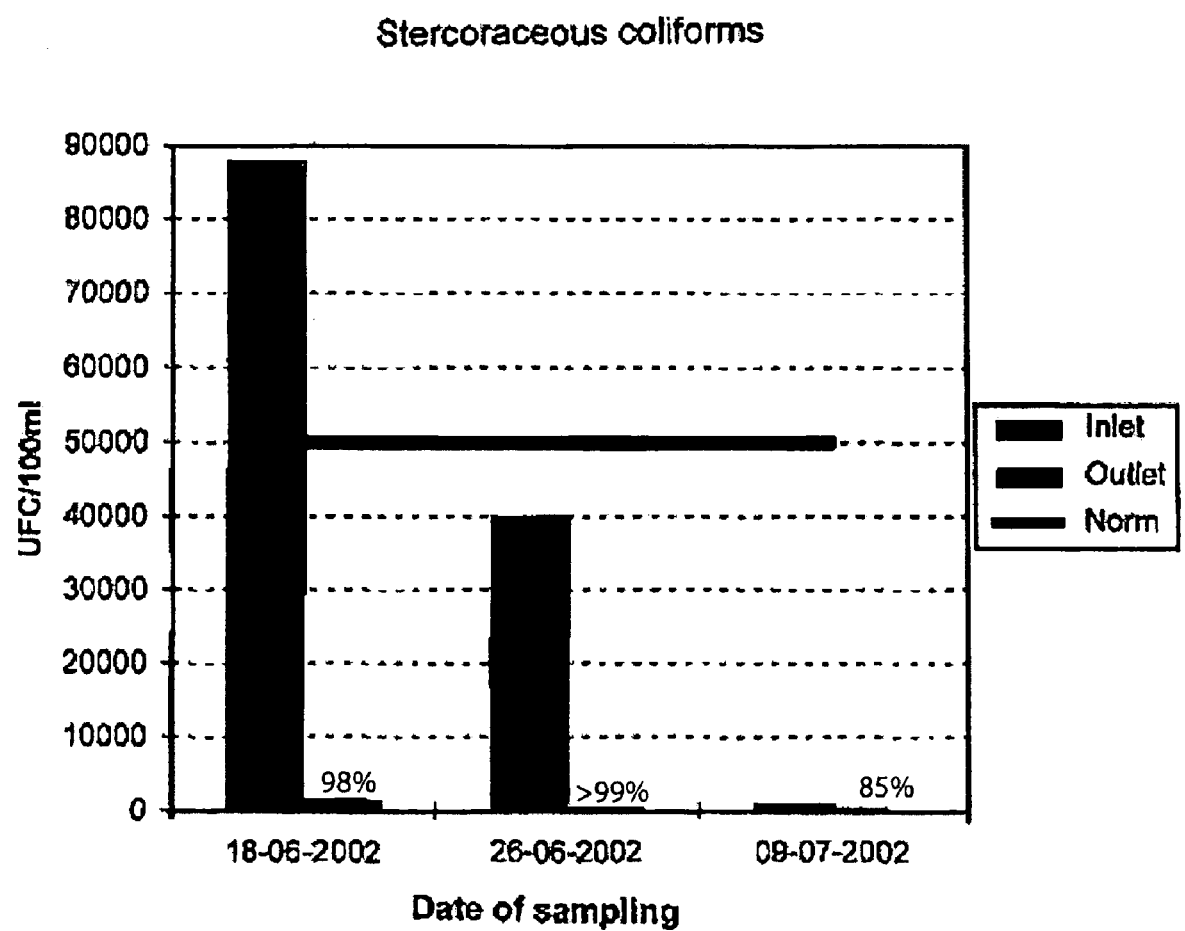
Figure 10: Diagram illustrating the stercoraceous coliforms

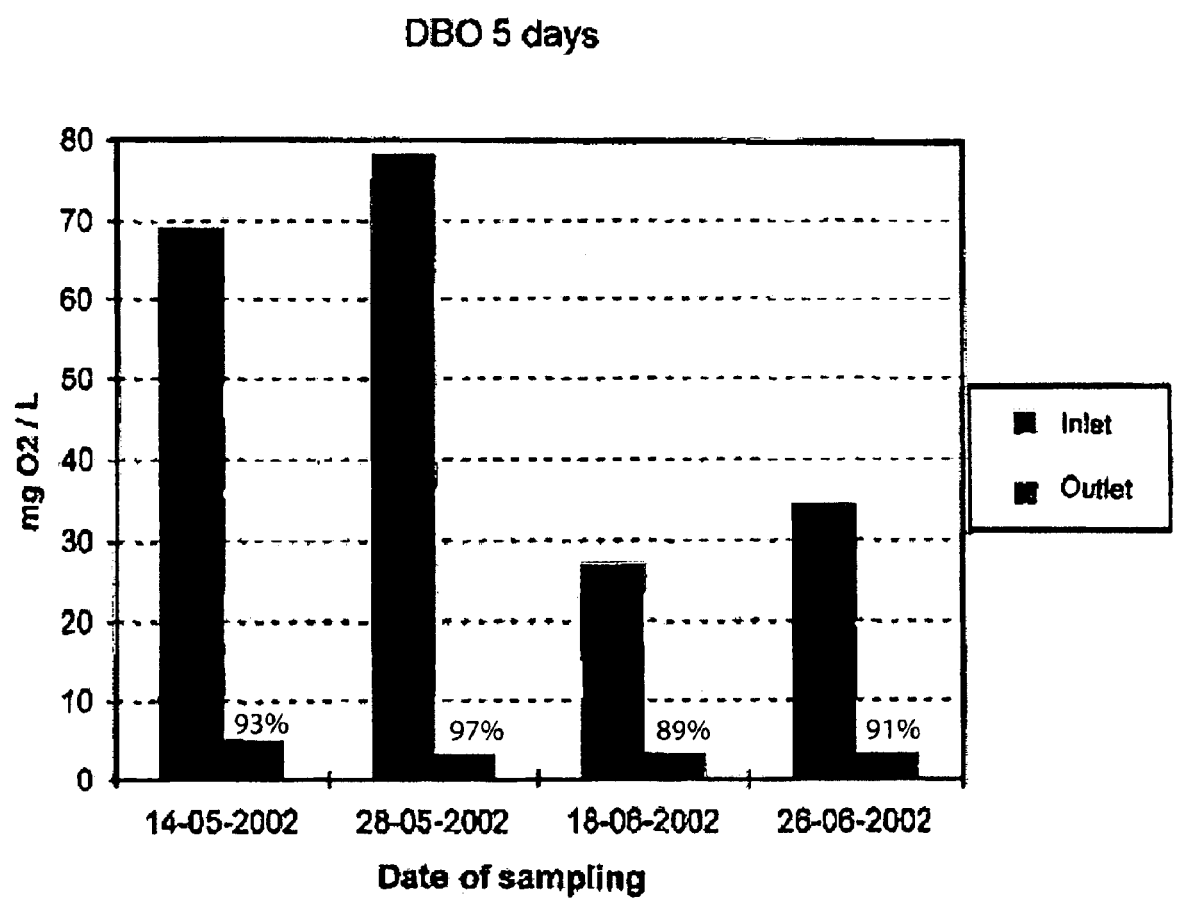
Figure 11: Diagram illustrating the DBO 5 days

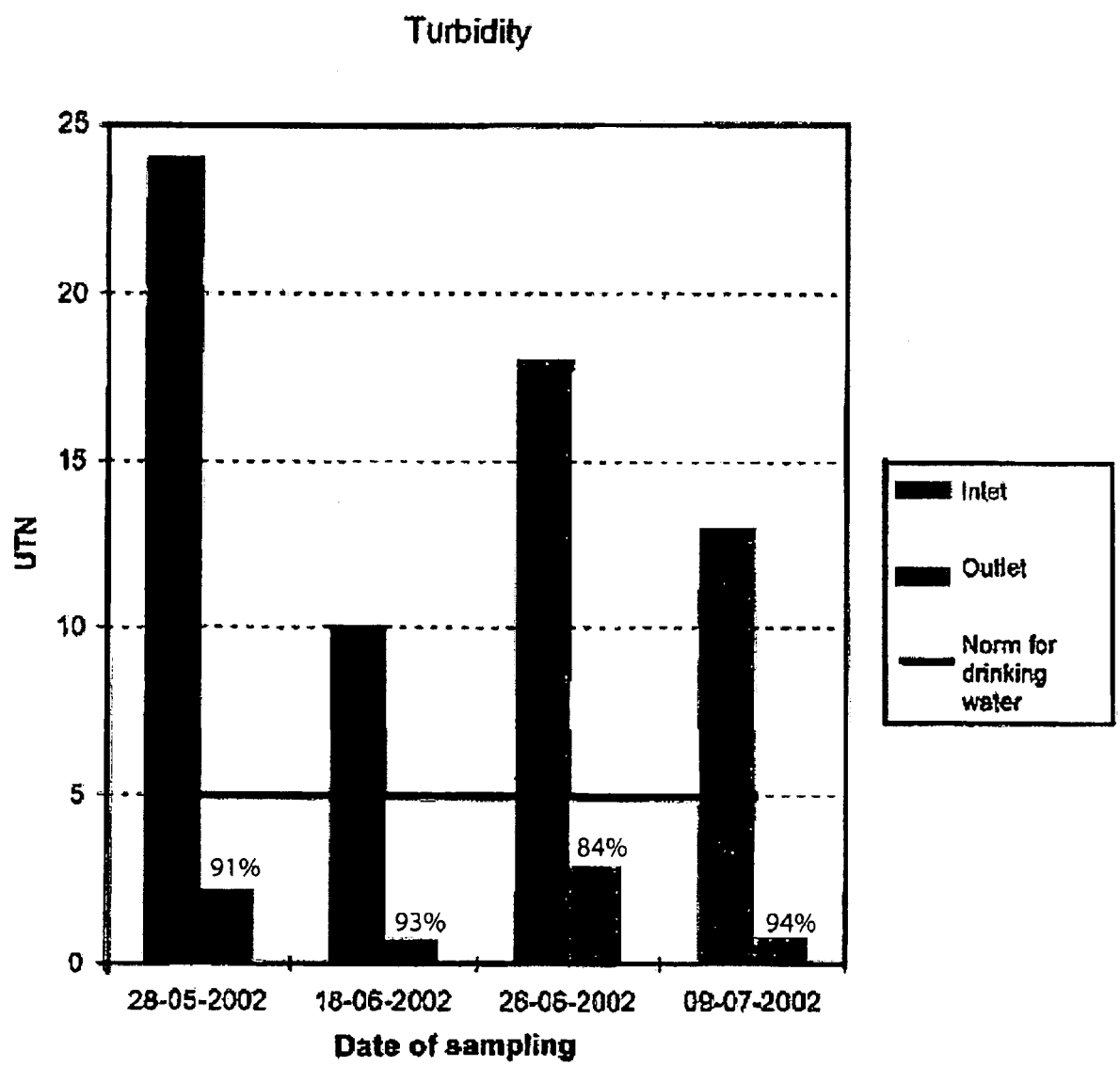
Figure 12: Diagram illustrating the turbidity

BACTERIA GROWTH DEVICE, ASSEMBLY INCLUDING THE SAME AND METHOD ASSOCIATED THERETO

CROSS-REFERENCE TO RELATED APPLICATION

This is a divisional of copending application Ser. No. 10/486,420, filed Aug. 10, 2004, which is a National Stage under 35 U.S.C. §371 of PCT International Application No. PCT/CA02/01462, filed Sep. 26, 2002, which claims the benefit under 35 U.S.C. §119(e) of prior Canadian Application No. 2,357,907, filed Sep. 26, 2001, the entire contents of which are incorporated herein by reference.

FIELD OF THE INVENTION

The present invention relates to a bacteria growth device, hereinafter referred to also as a BIONEST® device. More particularly, the present invention relates to a bacteria growth device for use with bacteria in a substantially liquid medium, as well as to an assembly including such a device and the method associated thereto. Typically, the device, assembly, and method are used for treating and purifying wastewater effluents which are high in biochemical oxygen demand, such as the wastewater discharges of residential and/or industrial septic/wastewater tanks for example.

BACKGROUND OF THE INVENTION

Known in the art are several filtering apparatuses used for treating and purifying wastewater. For instance, the North American Filter Corporation has developed a filter known as the Waterloo Biofilter, which comprises an open cell foam wherein little blocks are cut into dimensions of about 3 inches by 3 inches. Typically, grey water is poured over the top of the blocks and flows down as air is blown up through the bottom of the open cell foam. By keeping the media wet with re-circulating grey water, the bacteria grow inside the foam. However, such a system is fairly expensive to maintain, as it constantly needs air blowing to generate aerobic bacteria in the foam and because a mechanical pump is required to continuously re-circulate the grey water over the foam.

Also known in the art are other filtering/purifying apparatuses used for treating and purifying wastewater. These include the following: leaching fields attached to septic tanks, biodisks (rotating disks), multimedia sand filters, fluidized beds (sand suspended in water), Zenon Zeeweed® filters, ECO FLOW® (peat moss) and plastic spheres, balls, stars, honeycombs, and the like.

A major problem with the devices that use peat moss and other similar substances for filtering/purifying applications is that these substances are biodegradable, and thus get eaten by bacteria with time and turn into mock, which is very undesirable, as is known in the art.

Known to the Applicant are the following U.S. patents which describe different purifying apparatuses and methods: U.S. Pat. Nos. 4,615,803; 5,206,206; 5,618,414; 5,811,002; 5,913,588; 6,063,276; 6,110,374; and 6,162,020.

Also known to the Applicant are the following international patent applications which also describe different purifying apparatuses and methods: WO 87/05593; WO 91/16496; WO 01/04060; WO 01/12563; WO 01/56936; and WO 01/66475.

These different apparatuses and methods are disadvantageous because they tend to be elaborate in design; require a substantial amount of energy input for operating; are fairly expensive and/or difficult to manufacture/assemble/install; require considerable maintenance; etc.

SUMMARY OF THE INVENTION

The object of the present invention is to provide an improved device for promoting the growth of bacteria, which satisfies some of the above-mentioned needs and which is thus an improvement over the devices known in the prior art.

In accordance with the present invention, the above object is achieved with a bacteria growth device for use with bacteria in a substantially liquid medium, the device comprising at least one strip having a surface area shaped and sized for receiving bacteria present in the substantially liquid medium and for allowing attachment of said bacteria onto the surface area of the at least one strip so as to promote growth of the attached bacteria.

Preferably, the at least one strip is intertwined and has a nest-like configuration, and the bacteria attached onto the surface area of the at least one strip are used for biologically consuming impurities contained in the substantially liquid medium.

Preferably also, each strip of the device is made of a non-toxic and non-biodegradable polymeric material.

According to another aspect of the present invention, there is also provided an assembly for treating a liquid containing impurities, the assembly comprising a reactor having:
  an inlet through which the liquid containing impurities is introduced into the reactor and an outlet through which the liquid removed of certain impurities is discharged from the reactor; and
  at least one bacteria growth device such as the above-mentioned, the device being operatively positioned inside the reactor between the inlet and the outlet thereof so that the bacteria attached onto the surface area of the at least one strip of said device are used to biologically eliminate impurities from the liquid present in the reactor.

Preferably, the reactor further comprises neighboring first and second chambers, the chambers being in fluid connection with each other between the inlet and the outlet of the reactor, each of said chambers comprising at least one of said bacteria growth device, the first chamber being an aerobic chamber for eliminating impurities from the liquid with aerobic bacteria, and the second chamber being an anaerobic chamber for eliminating other impurities from the liquid with anaerobic bacteria.

According to yet another aspect of the present invention, there is also provided a method for treating a liquid containing impurities, the method comprising the steps of:
  a) introducing the liquid containing impurities into a reactor;
  b) providing a bacteria growth device such as the above-mentioned in the reactor of step a);
  c) allowing the bacteria attached onto the surface area of the at least one strip of the device to grow and eliminate impurities from the liquid present in the reactor; and
  d) evacuating the liquid removed of certain impurities from the reactor.

Preferably, step a) comprises the step of discharging a liquid containing impurities from a septic tank and/or settling tank into the reactor.

Preferably also, step d) further comprises the step of re-circulating the liquid removed of certain impurities back into the septic tank and/or settling tank.

The objects, advantages and other features of the present invention will become more apparent upon reading of the following non-restrictive description of preferred embodiments thereof, given for the purpose of exemplification only with reference to the accompanying drawings.

BRIEF DESCRIPTION OF THE DRAWINGS

FIG. 2 is a fragmentary enlarged plan view of the surface area of the strip shown in FIG. 1 according to a preferred embodiment of the invention.

FIG. 3 is a fragmentary enlarged plan view of the surface area of the strip shown in FIG. 1 according to another preferred embodiment of the invention.

FIG. 4 is a fragmentary enlarged plan view of the surface area of the strip shown in FIG. 1 according to yet another preferred embodiment of the invention.

FIG. 5 is a fragmentary enlarged plan view of the surface area of the strip shown in FIG. 1 according to yet another preferred embodiment of the invention.

FIG. 8 is a diagram illustrating the apparent color of the water.

FIG. 9 is a diagram illustrating the suspended matter.

FIG. 10 is a diagram illustrating the stercoraceous coliforms.

FIG. 11 is a diagram illustrating the DBO 5 days.

FIG. 12 is a diagram illustrating the turbidity.

DETAILED DESCRIPTION OF PREFERRED EMBODIMENTS OF THE INVENTION

Figure 1:
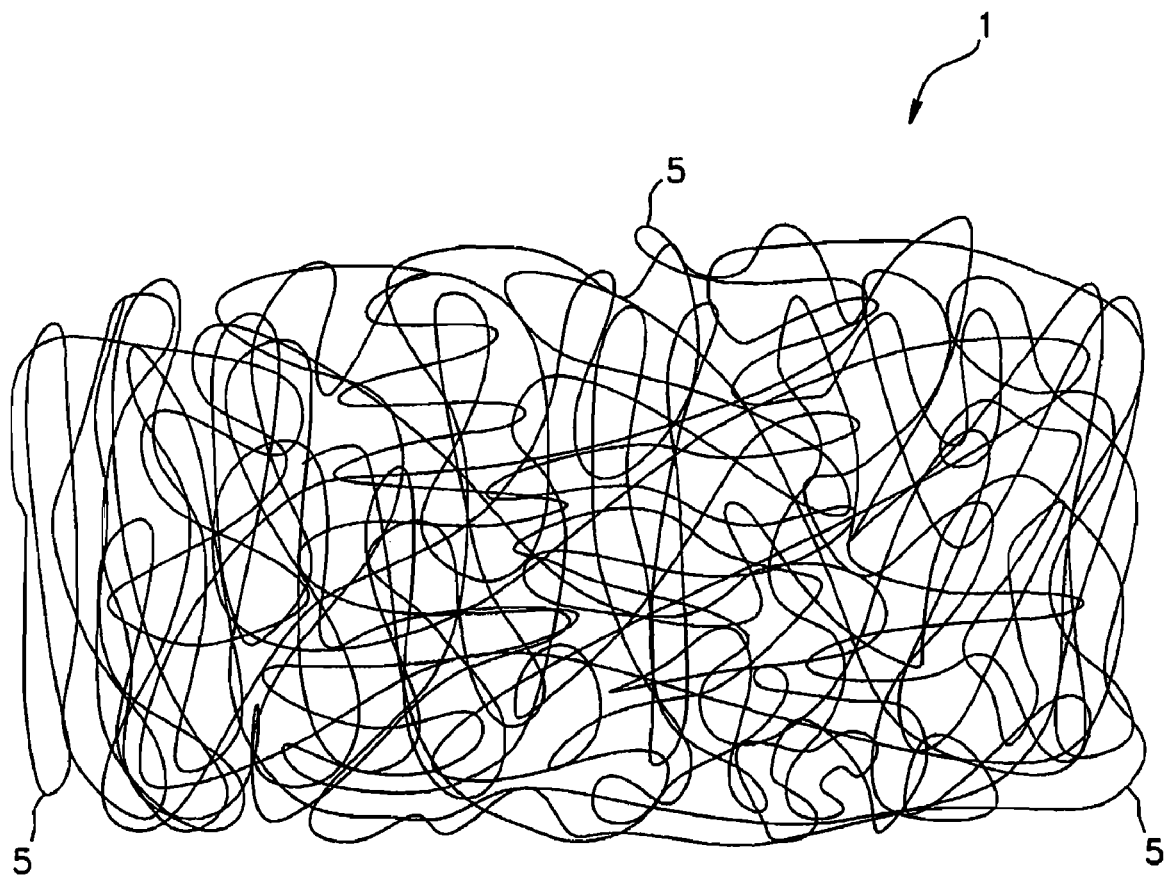
FIG. 1 is a schematic representation of the bacteria growth device according to the present invention, the device being shown with at least one strip intertwined into a nest-like configuration according to the preferred embodiment of the invention.

In the following description, the same numerical references refer to similar elements. The embodiments shown in the figures are preferred.

Furthermore, although the present invention was primarily designed for promoting the growth of attached bacteria destined to clean wastewater discharged from a septic tank, it may be used for promoting the growth of attached bacteria capable of interacting with other various types of liquids employed in other technical fields, as apparent to a person skilled in the art. For this reason, expressions such as "waste", "water", "septic" and the like should not be taken as to limit the scope of the present invention and include all other kinds of liquids or technical applications with which the present invention may be used and could be useful.

Moreover, in the context of the present invention, the expressions "water", "liquid", "effluent", "discharge", and any other equivalent expression known in the art used to designate a substance displaying liquid-like features, as well as any other equivalent expressions and/or compound words thereof, may be used interchangeably. Furthermore, expressions such as "polluted", "contaminated" and "soiled" for example, may also be used interchangeably in the context of the present description. The same applies for any other mutually equivalent expressions such as "septic" and "settling", as well as "reactor", "assembly" and "clarifier" for example, as also apparent to a person skilled in the art. Moreover, in the context of the present invention, "anaerobic" may also be used to designate and include "anoxic", as apparent to a person skilled in the art.

In addition, although the preferred embodiment of the present invention as illustrated in the accompanying drawings comprises various components, such as small pumps, air returns, etc., and although the preferred embodiment of the present invention as shown consists of certain geometrical configurations and arrangements, not all of these components, geometries and/or arrangements are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations and arrangements may be used for the bacteria growth device 1 and corresponding assembly 3 according to the present invention, as will be briefly explained hereinafter, without departing from the scope of the invention.

Broadly described, the device 1 according to the present invention, as illustrated in the accompanying drawings, is a bacteria growth device 1 for use with bacteria in a substantially liquid medium, the device 1 comprising at least one strip 5 having a surface area shaped and sized for receiving bacteria present in the substantially liquid medium and for allowing attachment of said bacteria onto the surface area of the at least one strip 5 so as to promote growth of the attached bacteria. The substantially liquid medium may be enclosed in an aerobic environment, in which case the device 1 is used to promote the growth of aerobic bacteria. Alternatively, the substantially liquid medium may be enclosed in an anaerobic environment, in which case the device 1 is used to promote the growth of anaerobic bacteria. The bacteria according to the present are preferably selected from the group consisting of nitrosominous, nitrobacters, and the like. It is worth mentioning however that other suitable bacteria (and corresponding enzymes), whether naturally occurring in the fluid medium or introduced therein from an outside source, may be used according to the present invention, depending on the particular applications for which the bacteria growth device 1 is intended and the particular liquid medium with which it is intended to interact, as apparent to a person skilled in the art.

Preferably, at least one strip 5 is intertwined and has a nest-like configuration, as better shown in FIG. 1. It is to be understood, as apparent to a person skilled in the art, that according to the present invention, the bacteria growth device 1 may comprise one single elongated strip 5 or a plurality of strips 5 bundled up together so as to obtain a desired nest-like configuration, such as the one illustrated in FIG. 1, or any other suitable geometrical configuration (whether one-, two-, or three-dimensional configuration; whether orderly or random spatial disposition; and/or whether tightly packed or loosely fitted; etc), depending on the particular applications for which the bacteria growth device 1 is intended and the particular liquid medium with which it is intended to interact, as apparent to a person skilled in the art. Indeed, among other considerations, the geometrical configuration of the bionest 1 according to the present invention should be intended to allow an appropriate flow rate of the liquid medium therethrough, as also apparent to a person skilled in the art.

Preferably, the bacteria attached onto the surface area of each strip 5 of the device 1 are used for biologically consuming impurities which may be contained in the substantially liquid medium, such as waste products contained in wastewater for example. Preferably, the substantially liquid medium is selected from the group consisting of grey water, black water, domestic wastewater, industrial wastewater, and the like. Consequently, each strip 5 is preferably made of a non-toxic and non-biodegradable polymeric material, which is preferably selected from the group consisting of high-density polyethylene, polypropylene, and the like, as apparent to a person skilled in the art. The strip(s) 5 of the device 1 are preferably made with a suitable and cost-effective manufacturing process selected from the group of milling, extrusion, molding, machining, casting, and the like, as also apparent to a person skilled in the art.

It is worth mentioning here that the strip(s) 5 of the device 1 can be made of any type of suitable material that is not bioacidal in its nature, i.e. that will not be detrimental to the attachment and growth of bacteria, unlike polyvinyl chloride for example. Preferably, the material used for the strip(s) 5 of the device 1 is a plastic that is compatible to bacteria growth rather than a plastic that may disintegrate in time and leach toxic chemical that would kill the bacteria, as apparent to a person skilled in the art.

As aforementioned, the plastic that is used for the strip(s) 5 of the BIONEST® device 1 may be selected from the group consisting of high-density polyethylene, polypropylene or any other plastic that can be heated, extruded, molded, milled, cast and/or made in a way that will allow them to be loosely packed together. The strip(s) 5 of the device 1 should be constructed and arranged so as to not compress or collapse or disintegrate over time and/or stop the flow of the fluid medium passing through the device 1.

When considering the geometrical and dimensional features of the strip(s) 5 of the BIONEST® device 1, these strip(s) 5 should be manufactured as small and as thin as possible while being structurally sound and rigid at the same time. The rigidity is, among other factors, provided by the nature of the material used as well as the cross-section of the strip 5. It is important not to manufacture the strip(s) 5 of the device 1 too thin since it will become like a frail sheet that will collapse together and won't allow proper passage of the liquid medium there between the strip(s) 5.

Preferably, each strip 5 has a substantially rectangular cross-sectional area having a thickness of about 0.2 mm and a width of about 3.0 mm. Typically, for domestic applications, e.g. for a single-family household having three bedrooms, the nest-like configuration of the device 1 should occupy a volume of about 3 meters cube, for example. It should be understood that, according to the present invention, other suitable cross-sectional configurations may used for the strip(s) 5 of the BIONEST® device 1, as well as other volumetric dimensions, depending on the particular applications for which the bacteria growth device 1 is intended and the particular liquid medium with which it is intended to interact, as apparent to a person skilled in the art. However, it is worth mentioning that a structurally sound and very thin substantially rectangular cross-section is preferred in that it offer a greater surface area exposed for the amount of material used. Indeed, the greater the surface area of the strip 5, the greater the rate of bacteria attachment (and growth), which is very advantageous, as will be explained hereinafter. Furthermore, the less material used for the strip(s) 5 of the device 1, the less the resulting manufacturing costs, which is also advantageous.

Further to the geometrical and dimensional features of the strip(s) 5 which are preferably devised to increase the surface area thereof, it is worth mentioning that the peripheral surface of the strip(s) 5 of the device 1 according to the present invention may also be surface treated in various forms so as to further increase the effective surface area of the strip(s) 5, and thus increase the attachment and growth of the bacteria thereon, as will be briefly explained hereinbelow.

For example, FIGS. 2-5 show various strip(s) 5 which may be used for the device 1 according to the present invention and whose respective surfaces having been treated differently. For example, FIG. 2 illustrates a strip 5 as it is first produced from virgin or recycled polymer. FIG. 3 illustrates the same strip 5 of FIG. 2 after its surface area has been plasma etched. FIG. 4 shows a strip 5 made of polymeric material blended with a porous material prior to its final processing. FIG. 5 show the strip 5 of FIG. 4 after it has been plasma etched so as to expose the surfaces of the porous material trapped in the polymeric material to the bacteria so that they may better attach thereon, as apparent to a person skilled in the art.

As aforementioned, the strip(s) 5 of the device 1 may consist of a simple elongated polymeric strip 5, such as shown in FIG. 2. The surface area of each strip 5 may be etched, as better shown in FIG. 3. Preferably, the surface area of each one strip 5 of the device 1 is plasma etched. Preferably also, each strip 5 is made of a material containing an underlying porous substance, as better shown in FIG. 4. The porous substance is preferably exposed to the bacteria for attachment thereon through corresponding etches of the plasma etched surface area, as better shown in FIG. 5. Preferably also, the porous substance is selected from the group consisting of zeolite, activated carbon, porous stone/rock, and the like, as apparent to a person skilled in the art.

As shown in FIG. 5, the plasma etched strip 5 has superior adhesive qualities than the strip 5 of FIG. 1. Indeed, the adhesive qualities of the strip(s) 5 of the device 1 can be improved thanks to a known technology that allows processing of the plastic strip 5 that will in turn increase its adhesive properties. This technology is called Plasma Etch Technology, and essentially uses a gas in a vacuum with a high frequency RF or microwave. The surface of any plastic media can thus be appropriately etched to create a much larger effective surface area for the bacteria to attach thereto. This preferably includes all synthetic media that are presently being used to support bacteria growth, as apparent to a person skilled in the art.

As shown in FIGS. 4 and 5, the polymer strips 5 of the device 1 may comprise a porous substance blended inside of the plastic. Such porous substance may be zeolyte or activated carbon or any other porous-like material which is preferably non-toxic to bacterial growth. This porous substance is preferably blended into the strip 5 in such a way that it lies just below the surface of the plastic. Once the strips 5 are formed, the surface is etched off so as to create an opening on the surface to expose the porous substance and thereby creating a larger surface for bacteria growth. Therefore, any inert porous material that is preferably heat resistant may be used for the strip(s) 5 of device 1 according to the present invention.

Preferably also, the porous material is not affected by heat if the plastic is molded, cast, machined, extruded and/or formed by any other suitable manufacturing process in which heat may be generated. Furthermore, as can be easily understood by a person skilled in the art, the porous material should not have holes that are so big that the plastic will impregnate it and the plastic can be etched off easily from the surface with plasma etching.

The above-described material used for the strip(s) 5 of the device 1 is preferably manufactured by a suitable process after having been blended with the porous substance such as activated carbon, any zeolyte or other porous material that could be mixed into the plastic before the manufacturing phase of the strip(s) 5. The porous substance should be uniformly blended inside the plastic of the strip(s) 5 when completed. This blended composite material should then be machined or plasma etched as above-described, to etch the surface of the strip(s) 5 and thereby expose the porous substance trapped inside the plastic so as to thus increase substantially the effective surface area of the finished strip(s) 5.

Figure 6:
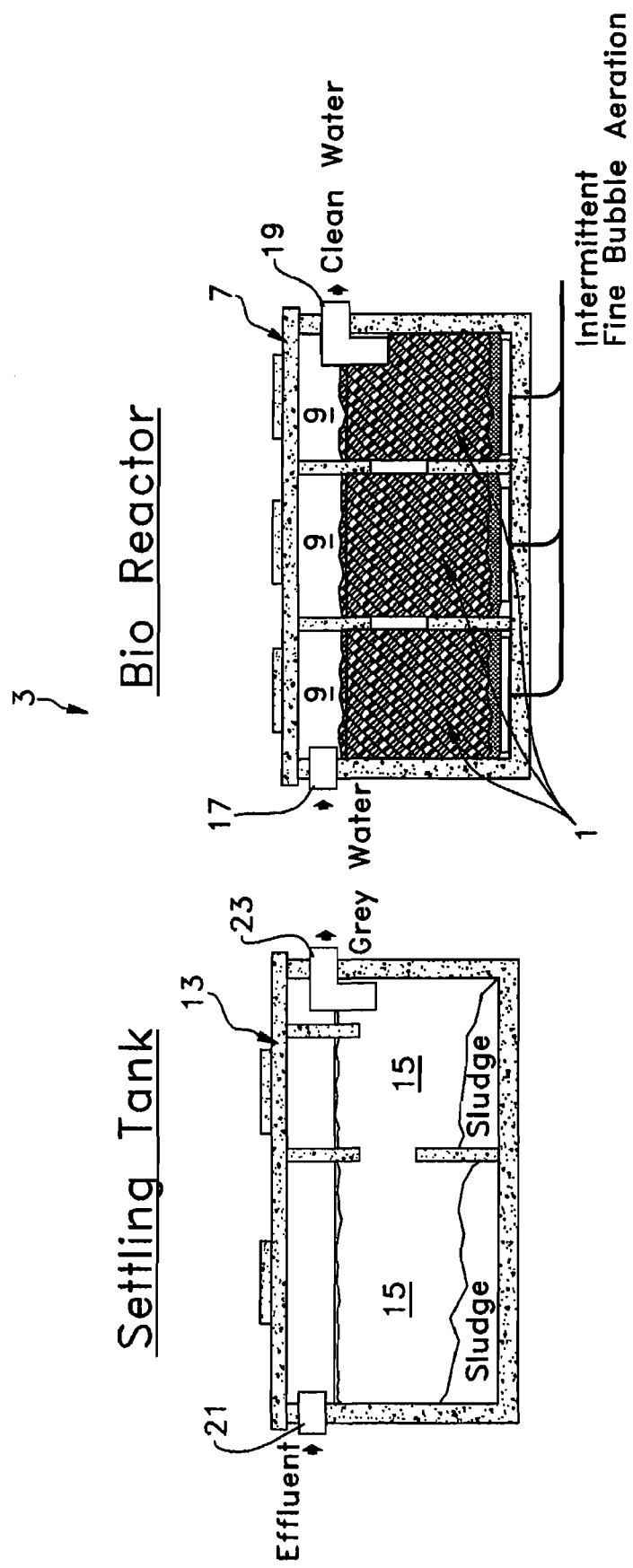
FIG. 6 is a schematic cross-sectional view of an assembly for treating a liquid containing impurities according to a first preferred embodiment of the invention.
Figure 7:
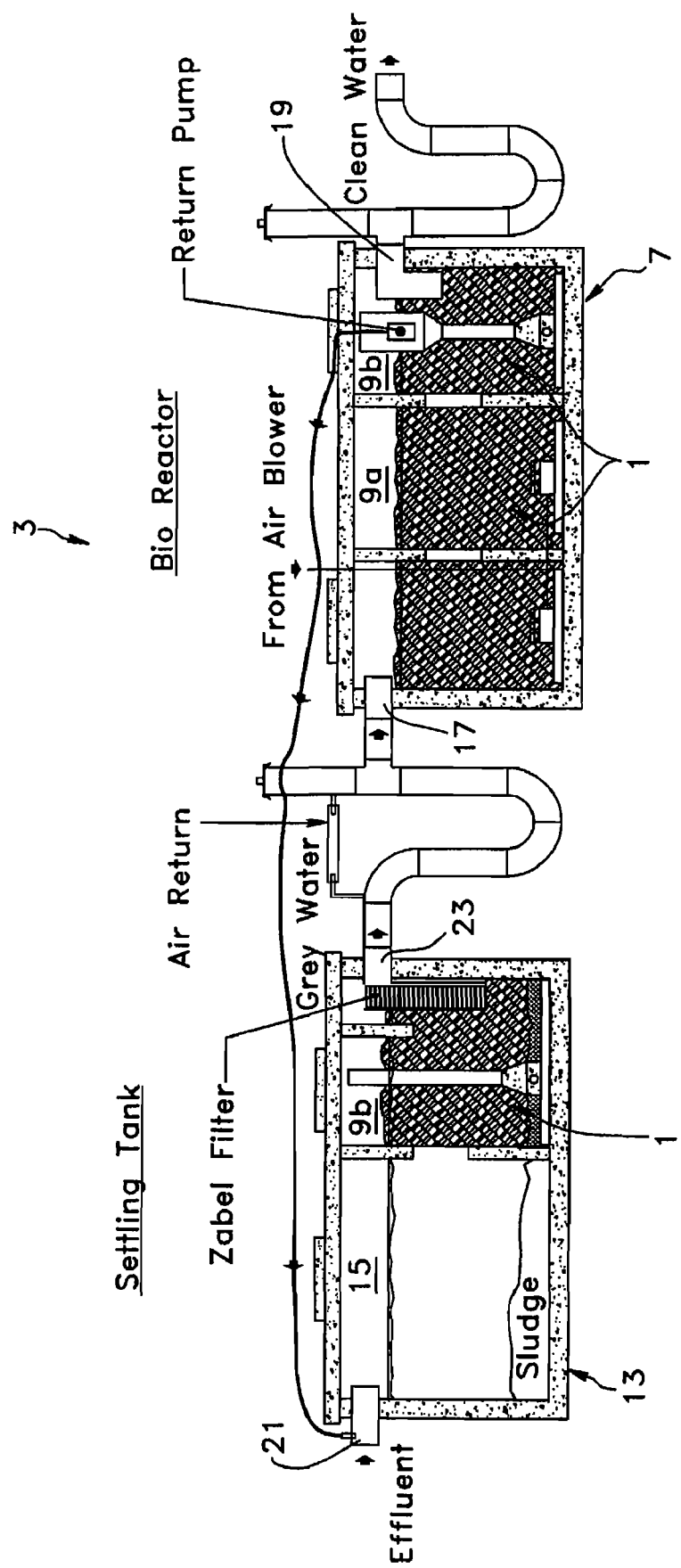
FIG. 7 is a schematic cross-sectional view of an assembly for treating a liquid containing impurities according to a second preferred embodiment of the invention.

As aforementioned, the present invention broadly relates also to an assembly 3 for treating a liquid (not shown) containing impurities. The assembly employs at least one bacteria growth device 1 such as the above-discussed for increasing bacterial growth thereon and also preferably employs a multi-chamber reactor 7 (or "clarifier") used after a settling tank 9 such as a domestic multi chamber septic tank for example, as shown in FIGS. 6 and 7, or a solids removal apparatus such as a screen, a filter, a screw or any other type of press, and the like, as apparent to a person skilled in the art. Preferably, the assembly 3 is used for increasing attached growth bacteria in aerobic/anaerobic chamber(s) 9 of a multi-chamber biological clarifier 7, typically attached to a settling tank 13, such as a septic tank for example, as shown in FIGS. 6 and 7. According to the preferred embodiments of the invention as shown in the accompanying drawings, the assembly 3 is mainly intended to carry out a process for purifying wastewater from a residential or community septic tank.

FIGS. 6 and 7 show the various general stages of decontamination of effluent, the first stage essentially consisting in the separation of the solids from the wastewater, in one or more settling chambers 15, the next stage essentially consisting in the remediation of the wastewater by bacteria growth device(s) in the various aerobic/anaerobic chambers 9 of the assembly 3.

Indeed, according to a particular aspect of the present invention, there is also provided an assembly 3 for treating a liquid containing impurities. The assembly comprises a reactor 7 having a) an inlet 17 through which the liquid containing impurities is introduced into the reactor 7; b) at least one bacteria growth device 1 as explained hereinabove, the bacteria attached onto the surface area of the at least one strip 5 of said device being used to biologically eliminate impurities from the liquid present in the reactor 7; and c) an outlet 19 through which the liquid removed of certain impurities is discharged from the reactor 7.

Preferably, the reactor 7 further comprises neighboring first and second chambers 9, the chambers 9 being in fluid connection with each other between the inlet 17 and the outlet 19 of the reactor 7, each of said chambers 9 comprising at least one of said device 1, the first chamber 9 being an aerobic chamber 9a for eliminating impurities from the liquid with aerobic bacteria, and the second chamber 9 being an anaerobic chamber 9b for eliminating other impurities from the liquid with anaerobic bacteria.

Preferably also, the assembly 3 further comprises a septic tank 13 having an inlet 21, and an outlet 23 connected to the inlet 17 of the reactor 7 so that a liquid containing impurities being discharged from the septic tank 13 is introduced into the reactor 7.

Referring particularly to the assembly 3 according to the first preferred embodiment of the invention as shown in FIG. 6, the assembly 3 comprises a multi-chamber container, the chambers 9 being separated by baffles so that air can access the first chamber 9 and provide aerobic biological treatment while the next chamber is deprived of air or oxygen so as to provide anaerobic treatment. Indeed, according to this embodiment, a series of subsequent chambers 9, preferably three chambers as shown, are alternately aerated and deprived of air or oxygen. Alternatively, it is worth mentioning that air could be turned on and off at varying intervals in each chamber 9 of the reactor 7 (or a single chamber 9 which could constitute the entire reactor for that matter) to promote the growth of both aerobic and anaerobic bacteria in the same chamber(s) 9 or reactor(s) 7. That is, it should be understood that instead of having the liquid to be treated flow continuously from one chamber 9a, 9b to another neighboring chamber 9b, 9a, from the inlet 17 to the outlet 19 of the reactor 7, in alternating aerobic/anaerobic conditions, the liquid being treated could be processed in a single chamber 9 of the reactor 7 by varying the aerobic/anaerobic conditions of the given chamber 9, i.e. the liquid being treated may be processed in "batches", as also apparent to a person skilled in the art.

Referring now particularly to the assembly 3 according to the second preferred embodiment of the invention as shown in FIG. 7, the septic tank 13 preferably comprises neighboring first and second chambers 15, 9, said chambers being in fluid connection with each other between the inlet 21 and the outlet 23 of the septic tank 13, the first chamber 15 of the septic tank 13 acting as a settling chamber 15, the second chamber 9 of the septic tank 13 comprising at least one of said device 1 and being an anaerobic chamber 9b for eliminating impurities from the liquid with anaerobic bacteria.

As better shown in FIG. 7, the first chamber 9a of the reactor 7 has a volume which is preferably twice that of the second chamber 9b, and the the first chamber 15 of the septic tank 13 has a volume which is preferably twice that of the second chamber 9b of the septic tank 13.

Preferably also, the outlet 19 of the reactor 13 is connectable to the inlet 21 of the septic tank 13 so that liquid containing impurities discharged from the reactor 7 may be re-circulated through the septic tank 13 and the reactor 7.

Preferably also, whether for the assembly 3 shown in FIG. 6 or FIG. 7, each chamber 9 which is not acting as a settling chamber 15 is filled with a loose bundle of non-toxic thin and narrow strips of elongated virgin or recycled polymer, i.e. the BIONEST® device 1, that allows for the free circulation of the wastewater through the attached growth bacteria (either nitrosominous or nitrobacters) completing the natural nitrogen cycle treatment or process in a controlled environment.

Preferably also, the polymer strips 5 of the device 1 serve to vastly increase the area on which bacteria can attach themselves and grow in the reaction chambers 9, thereby providing for faster and more efficient treatment for the liquid.

Minimal maintenance is required according to the present invention in that excess residue from bacterial action which falls off the device 1 becomes a source of carbon for further biological processing of the liquid and/or can be sucked away by appropriate vacuums placed at the bottom of the reactor. Alternatively, excess residue from bacterial action which falls off the device 1 can also be pumped out after an extended period of time, such as five years for example, through one or more of the container's covers.

The size of the container and its polymer strip bundle filled chambers 9 can be varied to allow for different retention times and meet specific goals for effluent discharge, as apparent to a person skilled in the art.

Treated effluent is preferably decontaminated to a quality level that meets national and local requirements for water being discharged either into the ground or for irrigation use, as also apparent to a person skilled in the art.

An important advantage of such a clarifying system is that it replaces a leaching field or bed and is sized according to the amount of wastewater produced by the septic tank 13 or community effluent discharge as well as it's specific biochemical oxygen demande ("b.o.d."). Water thus treated is decontaminated to a quality level that easily allows for its discharge either into the ground or surface discharge for irrigation.

Another important advantage of such a clarifying system comes from the fact that it is now possible to create a very large surface area for bacteria growth in a fairly delimited volume. Indeed, because attached growth bacteria need a surface to attach to and to grow, the greater the surface area one can create for a given volume possible, the greater the efficiency of the treatment, which is very advantageous.

Furthermore, the overall cost to produce the above-mentioned system is fairly low when compared to other prior art systems.

As aforementioned, the bacteria growth device 1 according to the present invention preferably comprises a non-toxic (virgin or recycled) polymer that is manufactured into thin strips 5 of various lengths and gathered in a loose bundle. The loose conformation of the polymer strips 5 is important in that allows unhindered wastewater to circulate through the device 1. Furthermore, this conformation allows the device 1 to fit within each of the multiple chambers 9 of an aerobic and anaerobic clarifier 7 that is fed with a residential or community domestic effluent (or any waste water source high in b.o.d.) from a settling tank 13 or multi-chambered septic tank 13. Moreover, the conformation of the polymer increases the surface area on which attached growth bacteria can proliferate and thus increases the efficiency and the treatment capacity of the clarifier 7.

After being manufactured by an appropriate process, the strip(s) 5 are preferably put into an irregular form either by putting them through a gear or spinning them or blowing them as they are growing so that they will adopt an irregular form, as better shown in FIG. 1. This is mainly to prevent them from substantially touching together and compacting together, because, as mentioned hereinabove, it important that the water flows through the device 1 without an excessive restriction carrying through the pollutants in the wastewater that the bacteria will remove, as apparent to a person skilled in the art.

According to another example of the present invention, there is also provided a method for treating a liquid containing impurities, the method comprising the steps of a) introducing the liquid containing impurities into a reactor 7; b) providing a bacteria growth device 1 such as the above-described in the reactor of step a); c) allowing the bacteria attached onto the surface area of the at least one strip 5 of the device 1 to grow and eliminate impurities from the liquid present in the reactor 7; and d) evacuating the liquid removed of certain impurities from the reactor 7.

Preferably, step a) comprises the step of discharging a liquid containing impurities from a septic tank 13 into the reactor 7.

Preferably also, step d) further comprises the step of re-circulating the liquid removed of certain impurities back into the septic tank 13.

EXAMPLES

The following examples are illustrative of the wide range of applicability of the present invention and is not intended to limit its scope. Modifications and variations can be made therein without departing from the spirit and scope of the invention. Although any method and material similar or equivalent to those described herein can be used in the practice for testing of the present invention, the preferred methods and materials are described.

The following are the results of the analysis of various parameters of water at the inlet 17 and at the outlet 19 of an assembly 3 including bacteria growth devices 1 according to the present invention, such as the one illustrated in FIG. 7.

TABLE 1

Results of the suspended matter.

| | Date of sampling | | | |
|---|---|---|---|---|
| | 28 May 2002 | 18 Jun. 2002 | 26 Jun. 2002 | 09 Jul. 2002 |
| Inlet | 24 mg/L | 23 mg/L | 22 mg/L | 8 mg/L |
| Outlet | <3 mg/L | <3 mg/L | 5 mg/L | <3 mg/L |

TABLE 2

Results of the stercoraceous coliforms.

| | Date of sampling | | |
|---|---|---|---|
| | 18 Jun. 2002 | 26 Jun. 2002 | 09 Jul. 2002 |
| Inlet | 88 000 UFC/100 mL | 40 000 UFC/100 mL | 1 000 UFC/100 mL |
| Outlet | 1 400 UFC/100 mL | 180 UFC/100 mL | 150 UFC/100 Ml |

TABLE 3

Results of the DBO 5 days.

| | Date of sampling | | | |
|---|---|---|---|---|
| | 14 May 2002 | 28 May 2002 | 18 Jun. 2002 | 26 Jun. 2002 |
| Inlet | 69 mg $O_2$/L | 78 mg $O_2$/L | 27 mg $O_2$/L | 34 mg $O_2$/L |
| Outlet | 5 mg $O_2$/L | <3 mg $O_2$/L | <3 mg $O_2$/L | <3 mg $O_2$/L |

TABLE 4

Results of the turbidity.

| | Date of sampling | | | |
|---|---|---|---|---|
| | 28 May 2002 | 18 Jun. 2002 | 26 Jun. 2002 | 09 Jul. 2002 |
| Inlet | 24 UTN | 10 UTN | 18 UTN | 13 UTN |
| Outlet | 2.2 UTN | 0.7 UTN | 2.9 UTN | 0.8 UTN |

TABLE 5

Summary of the various parameters analyzed.
Performance of the system during winter five months after installation

| | |
|---|---|
| Apparent color | 90% |
| Turbidity | 98% |
| Suspended matter | >99% |
| DBO 5 days | 99% |
| Stercoraceous coliforms | >99% |

TABLE 5-continued

Summary of the various parameters analyzed.
Performance of the system during winter five months after installation

| | |
|---|---|
| Total coliforms | >99% |
| Total nitrogen kjeldahl | 71% |
| Total phosphorus | 34% |

TABLE 6

Comparative overview between the results obtained and the norms required.

| | Result | Norm |
|---|---|---|
| Ammoniacal nitrogen | 0.24 mg N/L | |
| Total nitrogen kjeldahl | 1.12 mg N/L | |
| Stercoraceous coliforms (UFC/100 mL) | 150 | 50 000 |
| Total coliforms (UFC/100 mL) | 50 000 | |
| Apparent color | 23.7 UCA | |
| DBO 5 days | <3 mg $O_2$/L | |
| DCO | 25 mg $O_2$/L | |
| Suspended matter | <3 mg/L | 15 mg/L |
| Total phosphorus | 3.02 mg P/L | |
| Turbidity | 0.8 UTN | 5 UTN *for drinking water |
| DBO 5 carbonaced | <3 mg $O_2$/L | 15 mg O2/L |
| Nitrites/Nitrates | 5.57 | |

Thus, the above table indicates that the water treated by the present invention presents a much greater quality than that of most government standards. Furthermore, a very appreciable turbidity may be achieved, in that it is inferior to that of drinking water. Moreover, there is a remarkable absence of coliforms in the water treated with the present invention: 300 times less than that of the required norm.

As may now be appreciated, the present invention is a substantial improvement over the prior art in that the water treated by the bacteria growth device 1 and corresponding assembly 3 reaches, as demonstrated from the results herein, an exceptional quality enabling its reuse after minor disinfection, namely for residential needs (such as: showers, pools, washing and irrigation) or its rejection into water courses without adverse effect for the fauna and the flora.

Other advantages of the present invention, as can be easily understood from the above-discussed, are that the system enables a greater volume of nitrification/denitrification when compared to what is possible the majority of apparatuses and methods known in the art. Indeed, the great area covered by the bacteria growth device 1 enables to reduce the toxic concentrations of ammonia/nitrite/nitrate very rapidly. In addition, the shape and size of the surface area of the device 1, as well as the surface treatment thereof, enables a more rapid growth of the bacterial mass, even when the flow of the water being treated is high, by favouring adhesion, attachment and growth of the bacteria onto the strip(s) 5. Moreover, per meter squared, the present invention is one of the less costly water treatment devices on the market. Its high productivity translates into a greater infiltration for a smaller volume. Thus, the present invention is a low cost solution for any type of wastewater treatment application, whether residential or commercial.

Furthermore, the present invention is also advantageous in it results in a step forward with respect to the protection of the environment and the battle against the contamination of water resources by enabling to transform wastewater into an evacuated water of superior quality which may cleanse the phreatic surface into which it may be discharged by dilution effect. Indeed, the present secondary treatment system (device 1 and corresponding assembly/method) of wastewater is capable of purifying water at an exceptional rate of 95% and more, as shown hereinabove.

Other advantages that are possible with the present invention: it maintains the septic tank 13 but decreases of a third the surface used for the discharge field by replacing it by a biological reactor 7 preferably fed by gravity and by a polishing field; this treatment link acts independently of soil conditions; the present invention can act as a secondary treatment system which rejects a quality effluent enabling the maintenance of a healthy environment for the generations to come; the casing of the reactor 7 is of a dimension similar to that of the septic tank 13 and contains a medium enabling the bacterial attachment responsible for the purification of the water; the materials used with the present invention are non-biodegradable and thus requires no replacement over time; and installed underground, the biological reactor 7 does not modify at all the appearance of the land.

The present invention is also an improvement of the devices of the prior art, in that it also has the following advantages: the exceptional quality of the effluent rejected into the environment; a compact, efficient, and easy-to-install system; the maintenance is minimal, given the fact that it consists of a passive system, which may be entirely activated by gravity; permanent installation: the media is non-biodegradable, and thus requires no replacement; minimal costs of energy (approximately $5 per month for a single-family household with 3 bedrooms); capability to monitor at a distance; reduction of the pollution of the phreatic surface by dilution effect; reduces considerably the surface of the purification field; removes 99% of the *E. Coli* bacteria before that the effluent reaches the soil; efficient all throughout the season independent of weather conditions; possible use of the effluent for irrigation purposes following an additional ozone or sterilizing UV-ray treatment or the like.

As may now also be appreciated, the present invention is also advantageous in that it may be is used in various technical fields of nitrification/denitrification, namely in sewage treatment, aquaculture, aquariums and ponds, water processing, wastewater remediation, and the like.

While several embodiments of the invention have been described herein, it will be understood that the present invention is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention as defined in the appended claims.

What is claimed is:

1. An assembly (3) for treating a liquid containing impurities, the assembly (3) comprising a reactor (7) having:
    an inlet (17) through which the liquid containing impurities is introduced into the reactor (7) and an outlet (19) through which the liquid removed of certain impurities is discharged from the reactor (7); and
    at least one bacteria growth device (1) comprising at least one strip (5) that is self supporting and bundled up so as to form a nest-like and loose configuration, the at least one strip presenting a surface for attachment and growth of bacteria, the nest-like and loose configuration being constructed and arranged so that the nest-like and loose configuration allows for the free circulation of the liquid through the attached growth bacteria, the at least one strip having an irregular form that substantially prevents the nest-like configuration from compacting, wherein the at least one strip is made of a non-toxic and non-biodegradable polymeric material, the device (1) being operatively positioned inside the reactor (7) between the inlet (17) and the outlet (19) thereof.

2. An assembly (3) according to claim 1, wherein the reactor (7) further comprises neighboring first and second chambers (9), the chambers (9) being in fluid connection with each other between the inlet (17) and the outlet (19) of the reactor (7), each of said chambers (9) comprising at least one of said bacteria growth device (1), the first chamber (9) being an aerobic chamber (9*a*) for eliminating impurities from the liquid with aerobic bacteria, and the second chamber (9) being an anaerobic chamber (9*b*) for eliminating other impurities from the liquid with anaerobic bacteria.

3. An assembly (3) according to claim 2, wherein the first chamber (9) has a volume which is twice that of the second chamber (9).

4. An assembly (3) according to claim 2, wherein the assembly (3) further comprises a septic tank (13) having an inlet (21), and an outlet (23) connected to the inlet (17) of the reactor (7) so that a liquid containing impurities being discharged from the septic tank (13) is introduced into the reactor (7).

5. An assembly (3) according to claim 4, wherein the septic tank (13) further comprises neighboring first and second chambers (9), said chambers (9) being in fluid connection with each other between the inlet (21) and the outlet (23) of the septic tank (13), the first chamber (9) of the septic tank (13) acting as a settling chamber (15), the second chamber (9) of the septic tank (13) comprising at least one of said device (1) and being an anaerobic chamber (9*b*) for eliminating impurities from the liquid with anaerobic bacteria.

6. An assembly (3) according to claim 5, wherein the first chamber (9) of the septic tank (13) has a volume which is twice that of the second chamber (9) of the septic tank (13).

7. An assembly (3) according to claim 4, wherein the outlet (19) of the reactor (7) is connectable to the inlet (21) of the septic tank (13) so that liquid containing impurities discharged from the reactor (7) may be re-circulated through the septic tank (13) and the reactor (7).

\* \* \* \* \*

UNITED STATES PATENT AND TRADEMARK OFFICE
CERTIFICATE OF CORRECTION

PATENT NO.      : 7,578,398 B2                                Page 1 of 1
APPLICATION NO. : 11/683224
DATED           : August 25, 2009
INVENTOR(S)     : Garfield R. Lord It is certified that error appears in the above-identified patent and that said Letters Patent is hereby corrected as shown below:

On the cover page item (75):

Delete "Saint-Lazare (CA)" and insert -- Providenciales, Turks and Caicos Islands, British West Indies --

Signed and Sealed this
Twenty-fifth Day of January, 2011

David J. Kappos
*Director of the United States Patent and Trademark Office*